US005859144A

United States Patent [19]

Saito et al.

[11] Patent Number: 5,859,144

[45] Date of Patent: *Jan. 12, 1999

[54] PROCESS FOR PRODUCING RUBBER COMPOUND

[75] Inventors: Kuniyoshi Saito, Iwaki; Iwao Moriyama, Takahagi; Jun Okabe, Kitaibaraki, all of Japan

[73] Assignee: Nippon Mektron, Limited, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 712,701

[22] Filed: Sep. 12, 1996

[30] Foreign Application Priority Data

Sep. 29, 1995 [JP] Japan .................................... 7-276838

[51] Int. Cl.[6] ...................................................... C08L 15/02

[52] U.S. Cl. ....................... 525/326.2; 525/243; 525/244; 525/298; 525/302; 525/307; 525/313; 525/326.3; 526/206; 526/250; 526/254; 526/255; 526/911

[58] Field of Search .................................... 526/206, 250, 526/254, 255, 911; 525/326.2, 326.3, 243, 244, 307, 313, 298

[56] References Cited

U.S. PATENT DOCUMENTS

| | | | |
|---|---|---|---|
| 3,467,635 | 9/1969 | Brasen et al. . | |
| 4,380,618 | 4/1983 | Khan | 526/206 |
| 4,694,045 | 9/1987 | Moore . | |
| 5,356,964 | 10/1994 | Ishi et al. . | |
| 5,543,217 | 8/1996 | Morgan | 428/375 |

FOREIGN PATENT DOCUMENTS

| | | |
|---|---|---|
| 360 575 | 3/1990 | European Pat. Off. . |
| 481 372 (A2) | 4/1992 | European Pat. Off. . |
| 481 372 (A3) | 4/1992 | European Pat. Off. . |
| 518 073 | 12/1992 | European Pat. Off. . |
| 712 882 | 5/1996 | European Pat. Off. . |
| 48- 012 845 | 4/1973 | Japan . |
| 63- 312 836 | 12/1988 | Japan . |
| 63-312936 | 12/1988 | Japan . |
| 299 859 | 12/1989 | Japan . |

*Primary Examiner*—Fred Zitomer
*Attorney, Agent, or Firm*—Kenyon & Kenyon

[57] ABSTRACT

A rubber compound comprising a fluorine rubber component and an acrylic rubber component is produced by adding an acrylic monomer to an aqueous emulsion of fluorine-containing elastomer obtained by emulsion polymerization, using a fluorine-containing surfactant, followed by radical polymerization reaction. The obtained rubber compound can satisfy both of vulcanization moldability and heat aging resistance, and is at a lower cost than the expensive fluorine rubber.

11 Claims, No Drawings

PROCESS FOR PRODUCING RUBBER COMPOUND

BACKGROUND OF THE INVENTION

1. Field of the Invention

The present invention relates to a process for producing a rubber compound, and more particularly to a process for producing a rubber compound by radical polymerization of acrylic monomer in the presence of a fluorine-containing elastomer.

2. Related Prior Art

Acrylic copolymer elastomer (acrylic rubber) has good oil resistance and heat resistance, and also is at a relatively low cost and thus has been much used as vulcanization-molding materials such as various automobile sealing materials, etc. Higher temperature of using circumstances due to recent higher efficiency of automobile engines is requiring materials having a much better heat resistance. On the other hand, fluorine-containing elastomer (fluorine rubber) is used particularly at heat resistance-requiring positions, among the automobile engine sealing materials, because of its distinguished heat resistance, but its drawback is a very high cost.

In these situations many attempts to blend the acrylic rubber with fluorine rubber have been made to satisfy both of the heat resistance and cost, but the conventional art of cross-linking these two rubbers by a cocross-linking agent capable of cocross-linking these two rubbers hardly satisfied even the intermediate heat resistance between the heat resistance of the acrylic rubber and that of the fluorine rubber. For the required improvement, it has been regarded as important to make better the compatibility of these two rubbers.

JP-A-4-363352 discloses a process for improving the interdispersibility between a fluorine-containing polymer and an acrylic polymer by dissolving or swelling an amorphous, fluorine-containing polymer into or in an acrylic monomer, followed by polymerization reaction. Polymers obtained from the acrylic monomer are very liable to have a lower molecular weight, resulting in poor processability, and also their content in the rubber compound is low, so that the aim to lower the cost cannot be attained.

JP-A-1-299859 discloses the art of preventing boundary surface pealing by cross-linking substantially only acrylic rubber in blending of fluorine rubber with the acrylic rubber, thereby making the grain size of dispersed acrylic rubber and increasing the interfusion of molecules through the boundary surface between the two rubber, but the process is not suitable for mass production and it is hard to obtain a stable blending simply.

To solve these problems, JP-A-5-287156 proposes a process for blending an internally cross-linked acrylic rubber with a fluorine rubber, but when the internally cross-linked acrylic rubber is used in a higher blending ratio, no satisfactory plasticity is obtained and vulcanization molding is hard to conduct. That is, there is a limit to its blending ratio and the aim to lower the cost cannot be attained.

Known processes for making compatible polymers from non-compatible polymers include a process for forming an IPN (interfusion polymer network) of rubber components by dynamic cross-linking, thereby improving the impact resistance of crystalline resin, a process for seed polymerization (core-shell polymerization) to obtain a paint capable of producing good film characteristics, (JP-A-3-7784), etc., but in case of blend rubber having no thermoplasticity, IPN elastomer has a low plasticity and thus has a molding problem, and also there have no actual cases of applying the seed polymerization process to a non-compatible rubber system of fluorine rubber and acrylic rubber.

JP-A-63-312836 discloses addition of 100 to 500 parts by weight of α, β-ethylenic unsaturated carboxylic acid ester per 100 parts by weight of the fluorocarbon polymer in a primary particle dispersion of fluorocarbon polymer obtained by using a nonionic surfactant and an anionic surfactant, followed by rodical polymerization reaction, where the product is a fluorocarbon polymer compound having a hydrocarbon polymer outer layer and is no such compound that the individual polymers themselves are entangled with one another. The product compound is used as a coating composition and has a good dispersibility in water, an organic solvent, a synthetic resin solution or a synthetic resin dispersion.

SUMMARY OF THE INVENTION

An object of the present invention is to provide a rubber compound comprising a fluorine rubber component and an acrylic rubber component, which can satisfy both of vulcanization moldability and aging resistance, and is at a lower cost than the expensive fluorine rubber.

According to the present invention, a rubber compound is produced by adding an acrylic monomer to an aqueous emulsion of fluorine-containing elastomer obtained by emulsion polymerization of fluorine-containing monomer, using a fluorine-containing surfactant, followed by radical polymerization reaction.

DETAILED DESCRIPTION OF THE INVENTION

An aqueous emulsion of fluorine-containing elastomer can be obtained by emulsion polymerization of fluorine-containing monomer in the ordinary manner, using a fluorine-containing surfactant as an emulsifying agent. Fluorine-containing surfactant, such as ammonium perfluoro aliphatic carboxylate, for example, ammonium perfluorooctanoate, ammonium perfluorononaoate, etc. or sodium perfluorohexenyloxybenzenesulfonate, etc. can be used in an amount of about 0.1 to about 10% by weight, preferably about 0.5 to about 5% by weight, on the basis of the fluorine-containing monomer.

Fluorine-containing monomer includes, for example, vinylidene fluoride, tetrafluoroethylene, hexafluoropropene, pentafluoropropene, monochlorotrifluoroethylene, etc. Emulsion polymerization reaction is carried out as polymerization reaction of at least one kind of fluorine-containing monomer, generally two or three kinds of fluorine-containing monomer. In case of using only one kind of fluorine-containing monomer, copolymerization with an a-olefin such as ethylene, propylene, etc. is carried out. Preferably, the copolymerization reaction must be carried out by divisionally supplying the monomer from the viewpoint of composition uniformity of the product copolymer elastomer.

Fluorine-containing elastomer obtained by copolymerization of the fluorine-containing monomer includes, for example, vinylidene fluoride copolymer rubbers such as vinylidene fluoride—hexafluoropropene—tetrafluoroethylene terpolymer rubber, vinylidene fluoride—hexafluoropropene copolymer rubber, vinylidene fluoride—tetrafluoroethylene—chlorotrifluoroethylene terpolymer rubber, vinylidene fluoride—chlorotrifluoroethylene copolymer rubber, vinylidene fluoride—tetrafluoroethylene—propylene terpolymer rubber, etc.

Besides, tetrafluoroethylene—propylene copolymer rubber, etc. can be also used. These fluorine-containing elastomers may be copolymer elastomers obtained by copolymerization in the presence of a bromine- and/or iodine-containing saturated or unsaturated compound.

An acrylic monomer is added to the aqueous emulsion of fluorine-containing elastomer having a solid content of about 5 to about 50% by weight, preferably about 10 to about 30% by weight, followed by radical polymerization reaction.

Acrylic monomer generally comprises an alkyl acrylate with an alkyl group having 1 to 8 carbon atoms. Such an alkyl acrylate includes alkyl acrylates whose alkyl groups are methyl, ethyl, n-propyl, isopropyl, n-butyl, isobutyl, n-amyl, n-hexyl, 2-ethylhexyl, n-octyl, etc., and also alkyl acrylates with a substituted alkyl group such as 2-cyanoethyl acrylate, etc. Preferable is ethyl acrylate or n-butyl acrylate. Two or more of these alkyl acrylates can be used together.

Together with these alkyl acrylates, an alkoxyalkyl acrylate with an alkoxyalkyl group having 2 to 8 carbon atoms such as methoxymethyl acrylate, methoxyethyl acrylate, ethoxymethyl acrylate, ethoxyethyl acrylate, n-butoxyethyl acrylate, etc. can be used in an amount of about 1 to about 80% by mole, preferably about 10 to about 50% by mole, on the basis of total acrylic monomers.

Furthermore, the following unsaturated ester compounds having a hydroxyphenyl group, an acetoxyphenyl group or a trialkylsilyloxy group as a terminal group can be also used as a monomer coplymerizable with an acrylic monomer, in an amount of about 0.2 to about 30% by mole, preferably about 0.5 to about 10% by mole, on the basis of total monomers.

$CH_2$=CRCOO($CH_2$)nPhOR' (1)

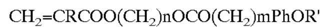

$CH_2$=CRCOO($CH_2$)nOCO($CH_2$)mPhOR' (2)

$CH_2$=CHOCO($CH_2$ )mPhOR' (3)

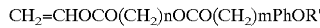

$CH_2$=CHOCO($CH_2$)nOCO($CH_2$)mPhOR' (4)

$CH_2$=CHO($CH_2$)nOCO($CH_2$)mPhOR' (5)

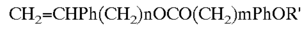

$CH_2$=CHPh($CH_2$)nOCO($CH_2$)mPhOR' (6)

where R: hydrogen atom or a methyl group

R': hydrogen atom, an acyl group or a trialkylsilyl group

Ph: a phenylene group, preferably a p-phenylene group, the phenylene group may have an alkyl group, an alkoxyl group, an alkoxyalkyl group, etc. as a substituent group n: an integer of 1 to 6 m: 0 or an integer of 1 to 3

These compounds are synthesized in the following manner:

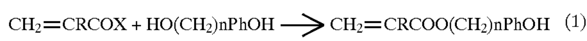

$CH_2$═CRCOX + HO($CH_2$)nPhOH ⟶ $CH_2$═CRCOO($CH_2$)nPhOH (1)

(X: halogen atom)

This reaction can be carried out as a condensation reaction of (meth)acrylic acid halide with 4-hydroxybenzyl alcohol, 4-hydroxyphenetyl alcohol or the like in the presence of a catalyst such as triethylamine or the like.

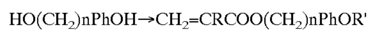

HO($CH_2$)nPhOH→$CH_2$=CRCOO($CH_2$)nPhOR'

This reaction can be carried out under the reaction conditions for the ordinary acylation reaction or trialkylsilylation reaction by adding to 4-hydroxybenzyl alcohol, 4-hydroxyphenetyl alcohol or the like an acylating agent, for example, an acid anhydride such as acetic anhydride, propionic anhydride, butyric anhydride, etc., or an acid halide such as acetyl halide, propionyl halide, butryl halide, etc., or trialkylhalogenosilane such as trimethylhalogenosilane, triethyl-halogenosilane, etc.

Or, the synthesis can be carried out through a direct condensation reaction, using 4-acetoxybenzyl alcohol, etc. as a raw material, as given by the following reaction equation:

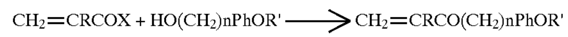

$CH_2$═CRCOX + HO($CH_2$)nPhOR' ⟶ $CH_2$═CRCO($CH_2$)nPhOR'

(X: halogen atom)

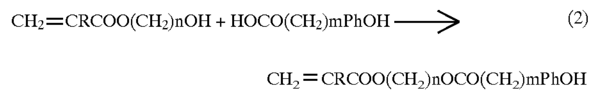

$CH_2$═CRCOO($CH_2$)nOH + HOCO($CH_2$)mPhOH ⟶ (2)

$CH_2$═CRCOO($CH_2$)nOCO($CH_2$)mPhOH

This reaction can be carried out as a condensation reaction of ω-hydroxyalkyl (meth)acrylate with 4-hydroxybenzoic acid, 4-hydroxyphenylacetic acid or the like in the presence of a dehydrating agent such as N,N'-cyclohexylcarbodiimide or the like. The reaction can be also carried out as a dehydrohalogenation reaction using an acid halide of 4-hydroxybenzoic acid, 4-hydroxyphenylacetic acid or the like in place of these acids. Then, the reaction for —PhOH→—PhOR' can be carried out in the same manner as in (1).

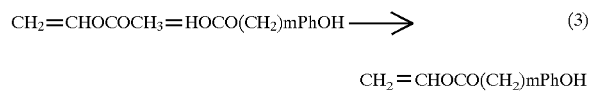

$CH_2$═CHOCOC$H_3$═HOCO($CH_2$)mPhOH ⟶ (3)

$CH_2$═CHOCO($CH_2$)mPhOH

Synthesis can be carried out by transesterification of a vinyl carboxylate ester, typical of which is vinyl acetate, with 4-hydroxybenzoic acid, 4-hydroxyphenylacetic acid, etc. in the presence of a catalyst of palladium acetate and potassium acetate, etc. Successively, reaction for —PhOH—PhOR' can be carried out in the same manner as in (1).

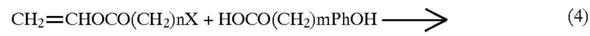

$CH_2$═CHOCO($CH_2$)nX + HOCO($CH_2$)mPhOH ⟶ (4)

$CH_2$═CHOCO($CH_2$)nOCO($CH_2$)mPhOH (X: halogen atom)

Synthesis can be carried out as a condensation reaction of vinyl monohalogenocarboxylate such as vinyl monochloroacetate with 4-hydroxybenzoic acid, 4-hydroxyphenylacetic acid or the like in the presence of a triethylamine catalyst, etc. Then, the reaction for —PhOH→—PhOR' can be carried out in the same manner as in (1).

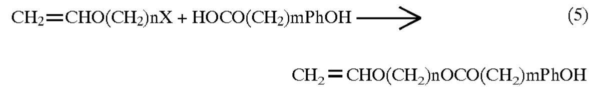

$CH_2$═CHO($CH_2$)nX + HOCO($CH_2$)mPhOH ⟶ (5)

$CH_2$═CHO($CH_2$)nOCO($CH_2$)mPhOH (X: halogen atom)

Synthesis can be carried out as a condensation reaction of ω-halogenoalkyl vinyl ether such as 2-chloroethyl vinyl ether with 4-hydroxybenzoic acid, 4-hydroxyphenylacetic acid or the like in the presence of an aqueous solution of sodium hydroxide, etc. as a catalyst. Then, the reaction for —PhOH→—PhOR' can be carried out in the same manner as in (1).

$$CH_2{=}CHPh(CH_2)nX + HOCO(CH_2)mPhOH \longrightarrow CH_2{=}CHPh(CH_2)nOCO(CH_2)mPhOH \quad (6)$$

(X: halogen atom)

Synthesis can be carried out as a condensation reaction of halogenoalkylstyrene such as p-chloromethylstyrene with 4-hydroxybenzoic acid, 4-hydroxyphenylacetic acid or the like in the presence of a triethylamine catalyst, etc. Then, the reaction for —PHOH→—PhOR' can be carried out in the same manner as in (1).

These monomers can be copolymerized with other vinyl monomer, olefin monomer, etc. within such a range as not to deteriorate the characteristics of the resulting rubber compound, for example, in a range of not more than about 40% by weight, preferably not more than about 20% by weight. Such other vinyl monomer includes, for example, vinyl chloride, vinylidene chloride, acrylonitrile, styrene, vinyl acetate, ethyl vinyl ether, alkyl methacrylate, furfuryl acrylate, 2-acetoxyethyl acrylate, 2-propoxyethyl acrylate, 4-acetoxybutyl acrylate, 4-propoxybutyl acrylate, ethylene glycol dimethacrylate, lactone ring-opened product (metha) acrylate adduct (JP-A-3-160008 and JP-A-6-145257), etc. Olefin monomer includes, for example, ethylene, propylene, etc.

It is preferable to subject about 0.1 to about 10% by weight, preferably about 0.1 to about 5% by weight, of a cross-linkable group-containing monomer, on the basis of the acrylic monomers, to the copolymerization, together with these acrylic monomers. Such cross-linkable group-containing monomer includes, for example:

(a) Epoxy group-containing vinyl monomer such as allyl glycidyl ether, vinyl glycidyl ether, glycidyl acrylate, glycidyl methacrylate, etc.

(b) Carboxyl group-containing vinyl monomer such as acrylic acid, methacrylic acid, itaconic acid, maleic acid monoester, etc.

(c) Reactive halogen-containing vinyl monomer such as 2-chloroethyl vinyl ether, 2-chloroethyl acrylate, vinyl monochloroacetate, etc.

(d) Dienic monomer such as isoprene, pentadiene, vinylcyclohexene, chloroprene, butadiene, methylbutadiene, cyclopentadiene, methylpentadiene, ethylidenenorbornene, vinylidenenorbornene, allyl acrylate, 2-butenyl acrylate, dihydroethylidenenorbornenyl acrylate, dihydrodicyclopentadienyl acrylate, vinylsilyl group-containing acrylate, etc.

(e) Hydroxyl group-containing vinyl monomer such as hydroxyalkyl acrylate, hydroxyalkyl methacrylate, hydroxyalkoxy acrylate, N-methylol acrylamide, etc.

Radical polymerization reaction of acrylic monomer in the aqueous emulsion of fluorine-containing elastomer is carried out as emulsion polymerization reaction, using about 100 to about 500 parts by weight, preferably about 100 to about 400 parts by weight, of acrylic monomer per 100 parts by weight of fluorine-containing elastomer in the aqueous emulsion. Emulsifying agent for the reaction includes, for example, anionic surfactants such as sodium oleate, potassium oleate, sodium laurylsulfate, sodium dodecylbenzenesulfonate, sodium dialkylsulfosuccinate, sodium alkyldiphenylethersulfonate, sodium polyoxyethylenealkylethersulfate, sodium polyoxyethylenealkylphenylethersulfate, etc., preferably sodium laurylsulfate, sodium dodecylbenzenesulfonate and polyoxyethylenealkylphenylethersulfate, or non-ionic surfactants such as polyoxyethylene derivatives, e.g. polyoxyethylenelauryl ether, polyoxyethyleneoleyl ether, polyoxyethyleneoctylphenyl ether, polyoxyethylenenonylphenyl ether, etc., polyethylene glycol derivatives, polyvinyl alcohol derivatives, etc., preferably polyoxyethylenelauryl ether and polyoxyethylenenonylphenyl ether. About 0.01 to about 5 parts by weight, preferably about 0.01 to about 1 parts by weight, of the emulsifying agent is used per 100 parts by weight of acrylic monomer.

Radical polymerization reaction is carried out at a temperature of about 0° to about 70° C. for about 0.5 to about 12 hours, using the ordinary radical reaction initiator, preferably a redox system thereof. After the polymerization reaction, the aqueous emulsion is coprecipitated in an appropriate manner, for example, by salting-out, acid precipitation, freeze coagulation, etc., and then the precipitate is washed with water and dried to recover a rubber compound.

Composition ratio of acrylic rubber component to fluorine rubber component in the rubber compound can be calculated from pyrolytic weight loss ratio by heating from 25° C. over to 800° C. in a nitrogen gas steam by thermogravimetric analysis, using a thermogravimetric analyzer type TG/DTA 220, commercially available from Seiko Denshi Kogyo, Japan. In the present rubber compound, composition ratio of acrylic rubber component to fluorine rubber component by weight can be made larger than the conventional one, for example, about 1 to about 5, particularly about 1 to about 4.

The thus obtained rubber compound can be mixed with a cross-linking agent, an acid acceptor and other necessary additives to form a cross-linkable composition. As a cross-linking agent, a quaternary onium salt, a polyhydroxy aromatic compound represented by bisphenol AF, an organic peroxide, etc. can be used.

As a quaternary onium salt, about 0.1 to about 30 parts by weight, preferably about 1 to about 20 parts by weight, of at least one of an ammonium salt and a phosphonium salt represented by the following general formula can be used per 100 parts by weight of blend rubber. Below about 0.1 parts by weight, no vulcanization products having desired properties can be obtained, whereas above 30 parts by weight vulcanization products have a smaller stretchability and are less practical:

$$(R_1R_2R_3R_4N)^+X^-$$

$$(R_1R_2R_3R_4P)^+X^-$$

where $R_1$ to $R_4$ are each an alkyl group having 1 to 25 carbon atoms, an alkoxy group, an aryl group, an alkylaryl group, an aralkyl group or a polyoxyalkylene group, or two or three of which may form a heterocyclic structure together with N or P; and $X^-$ is an anion such as $Cl^-$, $Br^-$, $I^-$, $HSO_4^-$, $H_2PO_4^-$, $RCOO^-$, $ROSO_2^-$, $RSO^-$, $ROPO_2H^-$, $CO_3^{--}$, etc.

When an organic peroxide is used as a cross-linking agent, about 0.1 to about 10 parts by weight, preferably about 0.5 to about 5 parts by weight, of a cross-linking aid such as triallyl isocyanurate, triallyl cyanurate, triallyl trimellitate, trimethylolpropane trimethacrylate, N,N-m-phenylene dimaleimide, etc. can be effectively used per 100 parts by weight of the rubber compound together with about 0.1 to about 10 parts by weight, preferably about 0.5 to about 5 parts by weight, of the organic peroxide.

As an acid acceptor, about 0.1 to about 30 parts by weight, preferably about 1 to about 20 parts by weight, of at least one of oxides and hydroxides of metals of divalency or higher valency such as calcium hydroxide, magnesium oxide, zinc oxide, titanium oxide, lead oxide, etc. is used per 100 parts by weight of blend rubber.

It is preferable that the vulcanization system further contains about 0.1 to about 5 parts by weight of aromatic carboxylic acid per 100 parts by weight of blend rubber. The aromatic carboxylic acid includes, for example, unsubstituted or substituted monocarboxylic acids or polycarboxylic acids such as benzoic acid, phthalic acid, terephthalic acid, methylbenzoic acid, chlorobenzoic acid, nitrobenzoic acid, hydroxybenzoic acid, etc. Preferably, benzoic acid is used. These aromatic carboxylic acids can be also used as equimolar molecule compounds with the quaternary phosphonium salt (see JP-B-59-23577).

The present blend rubber composition can contain, besides the above-mentioned essential components, other additives, such as a reinforcing agent, a filler, an antioxidant, a stabilizer, a plasticizer, a lubricant, etc., if required and can be prepared by kneading with an open roll mixer, a Banbury mixer, a kneader, etc. and vulcanized (cocross-linked) by press vulcanization (press cure) at a temperature of about 150° to about 220° C. for about one to about 30 minutes and by gear oven vulcanization (post cure) at a temperature of about 150° to about 220° C. for about 2 to about 70 hours.

A rubber compound having an improved dispersibility of fluorine rubber in acrylic rubber can be obtained by adding an acrylic monomer to an aqueous emulsion of fluorine-containing elastomer obtained by emulsion polymerization reaction of fluorine-containing monomer, using a fluorine-containing surfactant, followed by radical polymerization reaction. The present rubber compound has a good vulcanization moldability and an intermediate heat aging resistance between the heat aging resistance of acrylic rubber and that of fluorine rubber at a lower cost than that of the expensive fluorine rubber.

Thus, the present rubber compound can be effectively used as vulcanization molding materials for heat resistance-requiring oil seals, O-rings, gaskets, packings, hoses, etc.

PREFERRED EMBODIMENTS OF THE INVENTION

The present invention will be described in detail below, referring to Examples.

REFERENCE EXAMPLE 1

(Preparation of aqueous emulsion of VdF/HFP/TFE terpolymer rubber)

1500 ml of deionized water and 7.5g of sodium perfluorohexenyloxybenzenesulfonate were charged into an autoclave having a capacity of 3 liters, and the autoclave inside atmosphere was fully replaced with a nitrogen gas, followed by the autoclave inside pressure reduction. Then, the autoclave inside pressure was increased to 8 kg/cm$^2$ gauge by a gas mixture of vinylidene fluoride (VdF) / hexafluoropropene (HFP)/tetrafluoroethylene (TFE) in a ratio of 22/66/12 by weight and then the autoclave inside temperature was increased to 50° C. with stirring. 3.5 g of ammonium persulfate dissolved in 50 ml of deionized water was added to the autoclave under pressure and then a gas mixture of VdF/HFP/TFE in a ratio of 39/46/15 by weight was fed to the autoclave until the autoclave inside pressure reached 10 kg/cm$^2$ gauge to start polymerization reaction. Pressure reduction immediately occurred with the start of reaction, and thus when the autoclave inside pressure was lowered to 9 kg/cm$^2$ gauge, the autoclave was repressurized to 10 kg/cm$^2$ gauge with the latter gas mixture. Polymerization reaction was continued for 3 hours, while likewise maintaining the autoclave inside pressure at 9 to 10 kg/cm$^2$ gauge thereafter. After the reaction, the unreacted gas mixture was purged from the autoclave to discontinue the reaction, whereby an aqueous emulsion A having a solid content of 30% by weight was obtained. The aqueous emulsion was salted out, and the precipitate was thoroughly washed with water and dried, whereby a fluorine-containing elastomer A having a VdF/HFP/TFE composition ratio of 60/19/21 by mole (determined by $^{19}$F-NMR) and a Mooney viscosity of 74 pts at 100° C. was obtained.

REFERENCE EXAMPLE 2

(Preparation of aqueous emulsion of VdF/HFP copolymer rubber)

In Reference Example 1, the surfactant was replaced with ammonium perfluorooctanoate, the feed gas mixture composition ratio was changed to VdF/HFP of 24.5/75.5 by weight and the divisionally supplied gas mixture composition ratio was changed to VdF/HFP of 63.5/36.5 by weight. An aqueous emulsion B having a solid content of 32% by weight was obtained. From this aqueous emulsion, a fluorine-containing elastomer B having a VdF/HFP composition ratio of 78/22 by mole and a Mooney viscosity of 92 pts at 100° C. was obtained.

REFERENCE EXAMPLE 3

(Preparation of aqueous emulsion of VdF/RFP/TFE terpolymer rubber)

In Reference Example 1, the surfactant was replaced with ammonium perfluorooctanoate, the feed gas mixture composition ratio was changed to VdF/HFP/TFE of 27/57/16 by weight and the divisionally supplied gas mixture composition ratio was changed to VdF/HFP/TFE of 40/34/26 by weight, and furthermore 4.4 g of 1-bromo-2-iodoperfluoroethane was added to the autoclave under pressure before the charging of the aqueous ammonium persulfate solution. An aqueous emulsion C having a solid content of 28% by weight was obtained. From this aqueous emulsion, a fluorine-containing elastomer C having a VdF/HFP/TFE composition ratio of 58/20/22 by mole and a Mooney viscosity of 81 pts at 100° C. was obtained.

REFERENCE EXAMPLE 4

(Synthesis of 4-hydroxybenzyl acrylate)

1400 g of methyl isobutyl ketone, 50 g of 4-hydroxybenzyl alcohol and 40 g of triethylamine were charged into a separable flask having a capacity of 3 liters, provided with a stirrer and a nitrogen gas feed tube, and deaerated for 30 minutes, and then 33 g of acrylic acid chloride was dropwise added thereto at 3° C. over 50 minutes. Then, stirring was continued at room temperature for 3 hours. After completion of the reaction, the reaction mixture was recovered by filtration. The filtrate was washed with 0. 5N hydrochloric acid and with water, dehydrated over anhydrous sodium sulfate, and then subjected to silica gel column chromatography (eluent: n-hexane/ethyl acetate =10/1 by volume) to obtain the desired fraction. By distilling off the methyl isobutyl ketone solvent from the fraction under reduced pressure, 15 g of 4-hydroxybenzyl acrylate of the following chemical formula was obtained (yield: 26%):

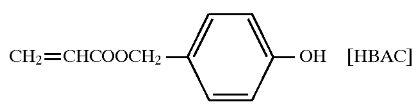

REFERENCE EXAMPLE 5

(Synthesis of p-hydroxybenzoyloxymethylstyrene)

1500 g of methyl isobutyl ketone, 69 g of 4-hydroxybenzoic acid and 58.0 g of triethylamine were charged into a separable flask as used in Reference Example 4, and after the flask was heated to 80° C. while replacing the flask inside atmosphere with a nitrogen gas, 72.4 g of p-chloromethylstyrene was dropwise added thereto over 2 hours. Then, stirring was continued for 6 hours. After the reaction, 3 liters water was added to the reaction mixture, and powdery precipitate was recovered therefrom and washed with n-hexane, whereby 36.2 g of p-hydroxybenzoyloxymethylstyrene of the following chemical formula was obtained (yield: 30%):

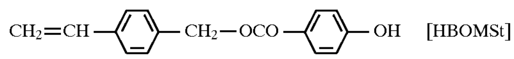

EXAMPLE 1

The following compounds were charged into a separable flask having a capacity of 10 liters, provided with a stirrer, a nitrogen gas inlet tube and a pressure-reducing unit:

| | |
|---|---|
| Aqueous emulsion A of Reference Example 1 | 1630 g |
| Ethyl acrylate | 245 g |
| n-Butyl acrylate | 245 g |
| p-Chloromethylstyrene | 10 g |
| Water | 1165 g |

Stirring was continued for one hour, while removing the flask inside oxygen thoroughly by repetition of removal and replacemant of the flask inside gas with a nitrogen gas, and then a polymerization initiator mixture consisting of:

| | |
|---|---|
| Sodium hydrosulfite | 0.05 g |
| Sodium formaldehyde sulfoxylate | 0.01 g |
| t-Butyl hydroperoxide | 0.025 g |

was added thereto to start polymerization reaction at room temperature. The reaction was continued at 50° C. for 6 hours. After the reaction, the reaction mixture was salted out and the precipitate was thoroughly washed with water and dried, whereby a rubber compound A having a Mooney viscosity of 56 pts at 100° C. was obtained. It was confirmed by the thermo-gravimetric analysis that the rubber compound A was in a composition ratio of acrylic rubber: fluorine rubber =51:49 by weight.

EXAMPLE 2

The following compounds were charged into a separable flask, as used in Example 1:

| | |
|---|---|
| Aqueous emulsion A of Reference Example 1 | 410 g |
| Sodium laurylsulfate | 2 g |
| Ethyl acrylate | 294 g |
| n-Butyl acrylate | 294 g |
| p-Chloromethylstyrene | 12 g |
| Water | 1165 g |

Then, addition of the polymerization initiator mixture and polymerization reaction were carried out in the same manner as in Example 1, whereby a rubber compound B having a Mooney viscosity of 51 pts at 100° C. was obtained. It was confirmed that the rubber compound B was in a composition ratio of acrylic rubber: fluorine rubber=78:22 by weight.

EXAMPLE 3

The following compounds were charged into a separable flask, as used in Example 1:

| | |
|---|---|
| Agueous emulsion A of Reference Example 1 | 1100 g |
| Polyoxyethylenelauryl ether (Emulgen, trademark of a product commercially available from Kao K. K., Japan) | 1 g |
| Sodium polyoxyethylenealkylphenyl ether sulfate (Levenol WZ, trademark of a product commercially available from Kao K. K., Japan) | 1 g |
| Ethyl acrylate | 240 g |
| n-Butyl acrylate | 245 g |
| Ethyleneglycol diacrylate | 0.1 g |
| HBAC of Reference Example 4 | 15 g |
| Water | 1165 g |

Addition of the polymerization initiator mixture and polymerization reaction were carried out in the same manner as in Example 1, whereby a rubber compound C having a Mooney viscosity of 49 pts at 100° C. was obtained. It was confirmed that the rubber compound C was in a composition ratio of acrylic rubber: fluorine rubber=58:42 by weight.

EXAMPLE 4

In Example 3, the amount of polyoxyethylenelauryl ether was changed to 2 g, and the same amount of HBOMSt of Reference Example 5 was used in place of HBAC of Reference Example 4, whereby a rubber compound D having a Mooney viscosity of 44 pts at 100° C. was obtained. It was confirmed that the rubber compound D was in a composition ratio of acrylic rubber fluorine rubber =56:44 by weight.

EXAMPLE 5

| | |
|---|---|
| Aqueous emulsion B of Reference Example 2 | 1030 g |
| Polyoxyethylenelauryl ether | 5 g |
| Ethyl acrylate | 238 g |
| n-Butyl acrylate | 237 g |
| Monobutyl maleate | 25 g |
| Water | 1235 g |

Addition of the polymerization initiator mixture and polymerization reaction were carried out in the same manner as in Example 1, whereby a rubber compound E having a Mooney viscosity of 62 pts at 100° C. was obtained. It was confirmed that the rubber compound E was in a composition ratio of acrylic rubber: fluorine rubber 59:41 by weight.

EXAMPLE 6

The following compounds were charged into a separable flask, as used in Example 1:

| | |
|---|---|
| Aqueous emulsion C of Reference Example 3 | 1750 g |
| Sodium dodecylbenzenesulfonate | 1 g |
| Ethyl acrylate | 200 g |
| n-Butyl acrylate | 200 g |
| 2-Methoxyethyl acrylate | 50 g |
| Ethyleneglycol diacrylate | 0.1 g |
| Water | 1050 g |

Addition of the polymerization initiator mixture and polymerization reaction were carried out in the same manner as in Example 1, whereby a rubber compound F having a Mooney viscosity of 58 pts at 100° C. was obtained. It was confirmed that the rubber compound F was in a composition ratio of acrylic rubber: fluorine rubber =50:50 by weight.

REFERENCE EXAMPLE 6

The following compounds were charged into a separable flask having a capacity of 3 liters, provided with a stirrer, a nitrogen gas inlet tube and a pressure-reducing unit:

| | |
|---|---|
| Ethyl acrylate | 250 g |
| n-Butyl acrylate | 250 g |
| p-Chloromethylstyrene | 10 g |
| Sodium laurylsulfate | 27.5 g |
| Water | 750 g |

Addition of the polymerization initiator mixture and polymerization reaction were carried out in the same manner as in Example 1, whereby an aqueous emulsion D was obtained. The aqueous emulsion D was salted out, and the precipitate was washed with water and dried, whereby an acrylic elastomer D having a Mooney viscosity of 45 pts at 100° C. was obtained.

REFERENCE EXAMPLE 7

In Reference Example 6, 25 g of HBOMSt of Reference Example 5 was used in place of p-chloromethylstyrene, whereby an aqueous emulsion E was obtained. The aqueous emulsion E was salted out, and the precipitate was washed with water and dried, whereby an acrylic elastomer B having a Mooney viscosity of 40 pts at 100° C. was obtained.

COMPARATIVE EXAMPLE 1

Fluorine-containing elastomer A of Reference Example 1 and acrylic elastomer D of Reference Example 6 were blended in a ratio of 50:50 by weight in an open roll, whereby a rubber compound G having a Mooney viscosity of 32 pts at 100° C. was obtained.

COMPARATIVE EXAMPLE 2

Aqueous emulsion A of Reference Example 1 and aqueous emulsion D of Reference Example 6 were provided to make a ratio of fluorine-containing elastomer A to acrylic elastomer A=50:50 by weight, and subjected to blending with stirring for 30 minutes. Then, the mixture was salted out, and the precipitate was washed with water and dried, whereby a rubber compound H having a Mooney viscosity of 43 pts at 100° C. was obtained.

COMPARATIVE EXAMPLE 3

Aqueous emulsion A of Reference Example 1 and aqueous emulsion E of Reference Example 7 were provided to make a ratio of fluorine-containing elastomer A to acrylic elastomer B=40:60 by weight, and subjected to blending with stirring for 30 minutes. Then, the mixture was salted out, and the precipitate was washed with water and dried, whereby a rubber compound I having a Mooney viscosity of 48 pts at 100° C. was obtained.

EXAMPLE 7

| | Parts by weight |
|---|---|
| Rubber compound A | 100 |
| Stearic acid | 1 |
| Antioxidant | 2 |
| (Nocrac CD, trademark of a product commercially available from Ohuchi-Shinko Kagaku K. K., Japan) | |
| MT carbon black | 30 |
| Calcium hydroxide | 5 |
| Magnesium oxide | 2 |
| Bisphenol AF | 1 |
| Benzyltriphenylphosphonium chloride | 0.4 |

The above components were kneaded in an open roll mixer and the kneaded mixture was vulcanization-molded by press vulcanization (press cure) at 180° C. for 10 minutes and by oven vulcanization (post cure) at 180° C. for 24 hours.

Adhesiveness of the compound and the surface flatness of the vulcanization product were evaluated, and also the normal state physical properties (according to JIS K-6301) and heat aging resistance (change in hardness after heating at 200° C. for 70 hours) were measured.

EXAMPLE 8

In Example 7, rubber compound B was used in place of rubber compound A.

EXAMPLE 9

In Example 7, rubber compound C was used in place of rubber compound A, and neither bisphenol AF nor benzyltriphenylphosphonium chloride was used, while 3 parts by weight of triallyl isocyanurate and 3.5 parts by weight of 2,5-dimethylhexane-2,5-dihydroperoxide (Perhexa 2,5 B-40, trademark of a product commercially available from Nihon Yushi K. K., Japan: 40%) were used.

EXAMPLE 10

In Example 7, rubber compound D was used in place of rubber compound A, and neither bisphenol AF nor benzyltriphenylphosphonium chloride was used, while 2 parts by weight of hexamethylenediamine carbamate was used.

EXAMPLE 11

In Example 7, rubber compound E was used in place of rubber compound A, and bisphenol AF was not used, while 0.5 parts by weight of benzoic acid was used and the amount of benzyltriphenylphosphonium chloride was changed to 2 parts by weight.

EXAMPLE 12

In Example 7, rubber compound F was used in place of rubber compound A and bisphenol AF was not used, while 0.5 parts by weight of benzoic acid was used and the amount of benzyltriphenylphosphonium chloride was changed to 2 parts by weight.

COMPARATIVE EXAMPLE 4

In Example 7, rubber compound G was used in place of rubber compound A.

COMPARATIVE EXAMPLE 5

In Example 7, rubber compound H was used in place of rubber compound A.

COMPARATIVE EXAMPLE 6

In Example 7, rubber compound I was used in place of rubber compound A, and bisphenol AF was not used, while the amount of benzyltriphenylphosphonium chloride was changed to 2 parts by weight.

COMPARATIVE EXAMPLE 7 (REFERENCE)

| | Parts by weight |
|---|---|
| Fluorine-containing elastomer A | 100 |
| MT carbon black | 25 |
| Calcium hydroxide | 5 |
| Magnesium oxide | 2 |
| Bisphenol AF | 2 |
| Benzyltriphenylphosphonium chloride | 0.4 |

The above components were subjected to kneading and press cure in the same manner as in Example 7, and then to post cure at 230° C. for 24 hours, and evaluation and measurements were carried out in the same manner as in Example 7.

COMPARATIVE EXAMPLE 8 (REFERENCE)

| | Parts by weight |
|---|---|
| Active chlorine group-containing acrylic elastomer (Noxtite PA401, trademark of a product commercially available from Nippon Mektron K. K., Japan) | 100 |
| Stearic acid | 1 |
| Antioxidant (Nocrac CD) | 2 |
| HAF carbon black | 50 |
| Sodium stearate | 3 |
| Potassium stearate | 0.5 |
| Sulfur | 0.3 |

The above components were subjected to kneading and press cure in the same manner as in Example 7 and then to post cure at 175° C. for 4 hours, and evaluation and measurements were carried out in the same manner as in Example 7.

Results of evaluation and measurements in Examples 7 to 12 and Comparative Examples 4 to 8 are shown in the following Table.

TABLE

| | Example No. | | | | | |
|---|---|---|---|---|---|---|
| | 7 | 8 | 9 | 10 | 11 | 12 |
| Compound Adhesiveness | None | None | None | None | None | None |
| Surface flatness of vulcanization product | Good | Good | Good | Good | Good | Good |
| Normal state physical properties | | | | | | |
| Hardness (JIS A) | 61 | 52 | 58 | 64 | 58 | 61 |
| 100% modulus (MPa) | 4.0 | 2.8 | 5.2 | 3.9 | 3.1 | 4.1 |
| Breaking strength (MPa) | 12.9 | 9.9 | 9.5 | 12.8 | 10.2 | 10.3 |
| Breaking elongation (%) | 240 | 360 | 240 | 280 | 300 | 220 |
| Heat aging resistance | | | | | | |
| Hardness change (pts) | +5 | +7 | +4 | +5 | +4 | +5 |

TABLE-continued

| | Comparative Example No. | | | | |
|---|---|---|---|---|---|
| | 4 | 5 | 6 | 7 | 8 |
| Compound adhesiveness | Slightly | Slightly | Slightly | None | None |
| Surface flatness of vulcanization product | Poor | Poor | Poor | Good | Good |
| Normal state physical properties | | | | | |
| Hardness (JIS A) | 59 | 57 | 58 | 72 | 72 |
| 100% modulus (MPa) | 3.3 | 3.2 | 3.6 | 4.1 | 4.7 |
| Breaking strength (MPa) | 8.4 | 8.6 | 8.6 | 15.7 | 16.8 |
| Breaking elongation (%) | 270 | 250 | 360 | 300 | 350 |
| Heat aging resistance | | | | | |
| Hardness change (pts) | +8 | +7 | +6 | ±0 | +13 |

What is claimed is:

1. A process for producing a rubber compound, which comprises:

preparing an aqueous emulsion of fluorine-containing elastomer by emulsion polymerization using a fluorine-containing surfactant;

adding an acrylic monomer to the aqueous emulsion of fluorine-containing elastomer; and reacting the acrylic monomer with the fluorine-containing elastomer by a radical polymerization reaction.

2. A process according to claim 1, wherein the aqueous emulsion of fluorine-containing elastomer is an aqueous emulsion obtained by using ammonium perfluoro aliphatic carboxylate as an emulsifying agent.

3. A process according to claim 1, wherein said fluorine-containing surfactant comprises sodium perfluorohexenyloxybenzenesulfonate.

4. A process according to claim 1, wherein about 100 to about 500 parts by weight of the acrylic monomer is used per 100 parts by weight of the fluorine-containing elastomer in the aqueous emulsion.

5. A process according to claim 1, wherein the acrylic monomer is an alkyl acrylate with an alkyl group having 1 to 8 carbon atoms.

6. A process according to claim 5, wherein at least one monomer of (a) an alkoxyalkyl acrylate with an alkoxyalkyl group having 2 to 8 carbon atoms and (b) an unsaturated ester compound having a hydroxyphenyl group, an acetoxyphenyl group or a trialkylsilyloxy group as a terminal group is used as part of the alkyl acrylate.

7. A process according to claim 6, wherein the alkoxyalkyl acrylate (a) is used in an amount of about 1 to about 80% by mole on the basis of total acrylic monomer.

8. A process according to claim 6, wherein the unsaturated ester compound (b) is used in an amount of about 0.2 to about 30% by mole on the basis of total monomer.

9. A process according to claim 6, wherein the unsaturated ester compound is at least one of the following compounds (1) to (6):

$CH_2$=CRCOO $(CH_2)$nPhOR' (1)

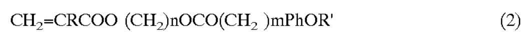

$CH_2$=CRCOO $(CH_2)$nOCO$(CH_2)$mPhOR' (2)

$CH_2$=CHOCO $(CH_2)$mPhOR' (3)

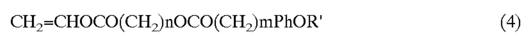

$CH_2$=CHOCO$(CH_2)$nOCO$(CH_2)$mPhOR' (4)

$$CH_2{=}CHO(CH_2)nOCO(CH_2)mPhOR' \quad (5)$$

$$CH_2{=}CHPh\ (CH_2)nOCO(CH_2)mPhOR' \quad (6)$$

where R is a hydrogen atom or a methyl group; R' is a hydrogen atom, an acyl group or a trialkylsilyl group; Ph is a phenylene group, the phenylene group may have an alkyl group, an alkoxyl group or an alkoxy-alkyl group as a substiuent group; n is an integer of 1 to 6; and m is 0 or an integer of 1 to 3.

10. A process according to claim 1, wherein a cross-linkable group-containing monomer is subjected to the radical polymerization reaction together with the acrylic monomer.

11. A process according to claim 10, wherein the linkable group-containing monomer is an epoxy group-containing vinyl monomer, a carboxyl group-containing vinyl monomer, a reactive halogen-containing vinyl monomer, a dienic monomer or a hydroxyl group-containing vinyl monomer.

* * * * *

UNITED STATES PATENT AND TRADEMARK OFFICE

CERTIFICATE OF CORRECTION

PATENT NO. : 5,859,144

DATED : January 12, 1999

INVENTOR(S) : Kuniyoshi Saito, Iwao Moriyama, and Jun Okabe

It is certified that error appears in the above-identified patent and that said Letters Patent is hereby corrected as shown below:

Column 2, line 53, change "a-olefin" to read –α-olefin--;

Column 5, line 59, change "emulsion. Emulsifying..." to read -- emulsion.

Emulsifying...–;

Column 8, line 30, change "RFP" to –HFP–;

Column 10, line 47, change "rubber fluorine" to –rubber: fluorine–;

Column 10, line 50, after "EXAMPLE 5" insert –The following compounds were charged into a separable flask, as used in Example 1:–;

Column 10, line 63, change "rubber 59:41" to -- rubber = 59:41 --;

Signed and Sealed this

Second Day of January, 2001

Attest:

Q. TODD DICKINSON

*Attesting Officer* *Commissioner of Patents and Trademarks*